US011557986B1

United States Patent
Ugartemendia

(10) Patent No.: US 11,557,986 B1
(45) Date of Patent: Jan. 17, 2023

(54) PASSIVE ELECTRIC GENERATOR SYSTEM

(71) Applicant: Juan Jose Ugartemendia, Miami, FL (US)

(72) Inventor: Juan Jose Ugartemendia, Miami, FL (US)

(*) Notice: Subject to any disclaimer, the term of this patent is extended or adjusted under 35 U.S.C. 154(b) by 0 days.

(21) Appl. No.: 17/833,485

(22) Filed: Jun. 6, 2022

(51) Int. Cl.
- H02N 11/00 (2006.01)
- H01M 10/05 (2010.01)
- H01M 10/0568 (2010.01)

(52) U.S. Cl.
CPC .......... *H02N 11/002* (2013.01); *H01M 10/05* (2013.01); *H01M 10/0568* (2013.01)

(58) Field of Classification Search
CPC .............................. H01M 6/04; H01M 6/045
See application file for complete search history.

(56) References Cited

U.S. PATENT DOCUMENTS

| | | | | |
|---|---|---|---|---|
| 1,621,518 A | * | 3/1927 | Pellini | H01M 6/24 429/109 |
| 3,386,858 A | * | 6/1968 | Cavanagh | H01M 8/16 429/224 |

* cited by examiner

*Primary Examiner* — Stephan J Essex
(74) *Attorney, Agent, or Firm* — Ruben Alcoba, Esq.

(57) ABSTRACT

A passive electric generator system that does not require solar energy or fossil fuels to operate. The system comprises of a copper housing, a first rubber plug that is attached to a first open end of the copper housing, at least one metal wire that has a length that has a length that is at least two inches greater than the copper housing, at least one perforated plastic wire cover that covers the at least one metal wire, an ionic liquid is housed within the copper housing, a second rubber plug that attaches to a second open end of the copper housing so that the at least one metal wire and the at least one plastic wire cover are in the copper housing and the at least one metal wire pierces through the second rubber plug so that an end of the at least one metal wire rests outwardly from a top side of the second rubber plug, and at least one electrical conductive wire that is fixedly attached to an outer surface of the copper housing. The at least one metal wire and the at least one electric conductive wire number the same in the electric generator.

8 Claims, 3 Drawing Sheets

US 11,557,986 B1

PASSIVE ELECTRIC GENERATOR SYSTEM

BACKGROUND

The present invention is an electric generator that does not require solar power or fossil fuels.

The present invention is made as an alternative form of creating energy that does not require solar cells or wind to generate energy.

The EPA states, "Solar panels provide clean, renewable energy from the sun, and their prevalence as an energy source has been growing. In 2020, solar panels provided about 40 percent of new U.S. electric generation capacity, compared to just four percent in 2010. Overall, 3.3 percent of electricity in the United States was produced using solar technologies in 2020."[1]

[1] Available at https://www.epa.gov/hw/end-life-solar-panels-regulations-and-management, titled END-OF LIFE SOLAR PANELS: REGULATIONS AND MANAGEMENT, captured on May 5, 2022.

However, the EPA also states, "like any source of energy, there are associated wastes that need to be properly recycled or disposed of when solar panels reach their end of life Hazardous waste testing on solar panels in the marketplace has indicated that different varieties of solar panels have different metals present in the semiconductor and solder. Some of these metals, like lead and cadmium, are harmful to human health and the environment at high levels. If these metals are present in high enough quantities in the solar panels, solar panel waste could be a hazardous waste."[2] The present invention provides a clean energy source that minimizes the hazardous waste that can be released into the environment.

[2] Id.

A Study by Stanford university states, "The advantages of wind energy are more apparent than the disadvantages. The main advantages include an unlimited, free, renewable resource (the wind itself), economic value, maintenance cost, and placement of wind harvesting facilities. First and foremost, wind is an unlimited, free, renewable resource. Wind is a natural occurrence and harvesting the kinetic energy of wind doesn't affect currents or wind cycles in any way. Next, harvesting wind power is a clean, non-polluting way to generate electricity. Unlike other types of power plants, it emits no air pollutants or greenhouse gases."[3]

[3] Available at http://large.stanford.edu/courses/2014/ph240/lloyd2/, Titled Wind Energy: Advantages and Disadvantages, by Dallas Lloyd, Dec. 11, 2014, captured on May 26, 2022.

However, the same study states, "The two major disadvantages of wind power include initial cost and technology immaturity. Firstly, constructing turbines and wind facilities is extremely expensive. The second disadvantage is technology immaturity. High cost of energy can, in part, be addressed directly with technology innovations that, increase reliability and energy output and lower system capital expenses."[4] The present invention is a low cost alternative to wind powered energy that is cost efficient to produce.

[4] Id.

The present invention is a passive electric generator that can easily be recycled and that is of a low cost to produce.

SUMMARY

The present invention is a passive electric generator system that can produce energy twenty-four hours every day.

The passive electric generator system comprises of a copper housing, a first rubber plug that is attached to a first open end of the copper housing, at least one metal wire that has a length that is at least two inches greater than the copper housing, at least one perforated plastic wire cover that covers the at least one metal wire, an ionic liquid is housed within the copper housing, a second rubber plug that attaches to a second open end of the copper housing so that the at least one metal wire and the at least one plastic wire cover are in, the copper housing and the at least one metal wire pierces through the second rubber plug so that an end of the at least one metal wire rests outwardly from a top side of the second rubber plug, and at least one electrical conductive wire that is fixedly attached to an outer surface of the copper housing. The at least one metal wire and the at least one electric conductive wire number the same in the electric generator.

An embodiment of the present invention shall comprise of an operational amplifier that will connect to at least one metal wire and to at least one electric conductive wire.

An object of the present invention is to provide a passive electric generator system that is cost effective to produce.

Another object of the present invention is to provide a passive electric generator system that can be recycled.

Yet another object of the present invention is to provide a passive electric generator system that will produce electric energy while causing minimal damage to the environment.

Yet still another object of the present invention is to provide a passive electric generator that will provide a cheap source of energy to the consuming public.

And, yet still another object of the present invention is to provide a passive electric generator that will not release pollutants to the environment while creating energy.

DRAWINGS

These and other features, aspects, and advantages of the present invention will become better understood with regards to the following description, appended claims, and drawings where:

DESCRIPTION

Figure 1:
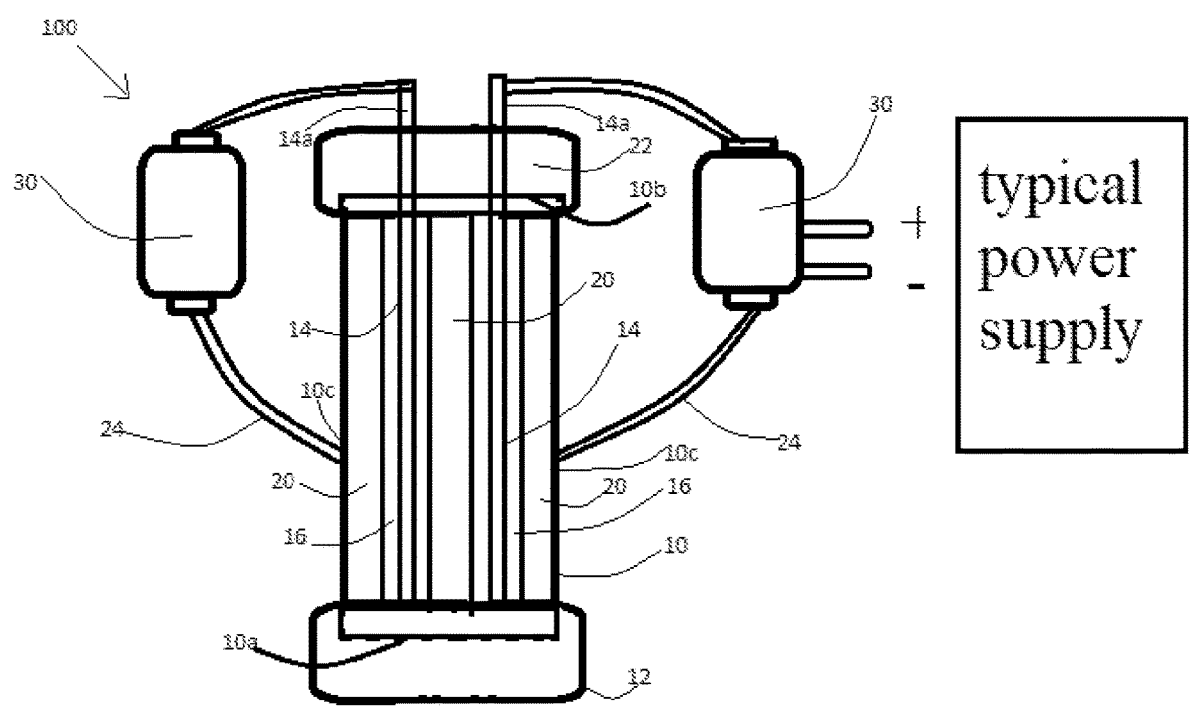
FIG. 1 shows a side view of a cross section of the present invention that shown only one passive electric generator system, the system is producing electricity in parallel.
Figure 2:
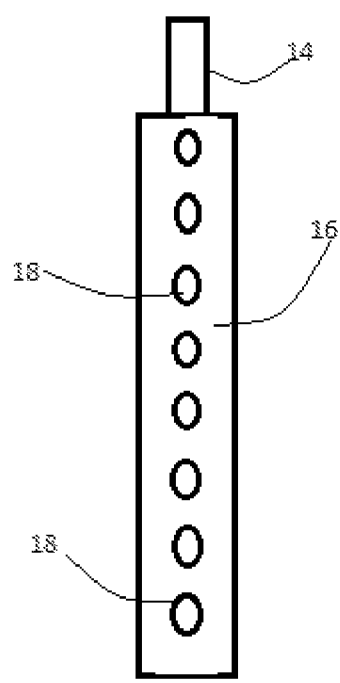
FIG. 2 is a side view of the at least one metal wire that is covered by the at least one wire cover of the present invention, the view shows the plurality of apertures in the at least one wire cover.
Figure 3:
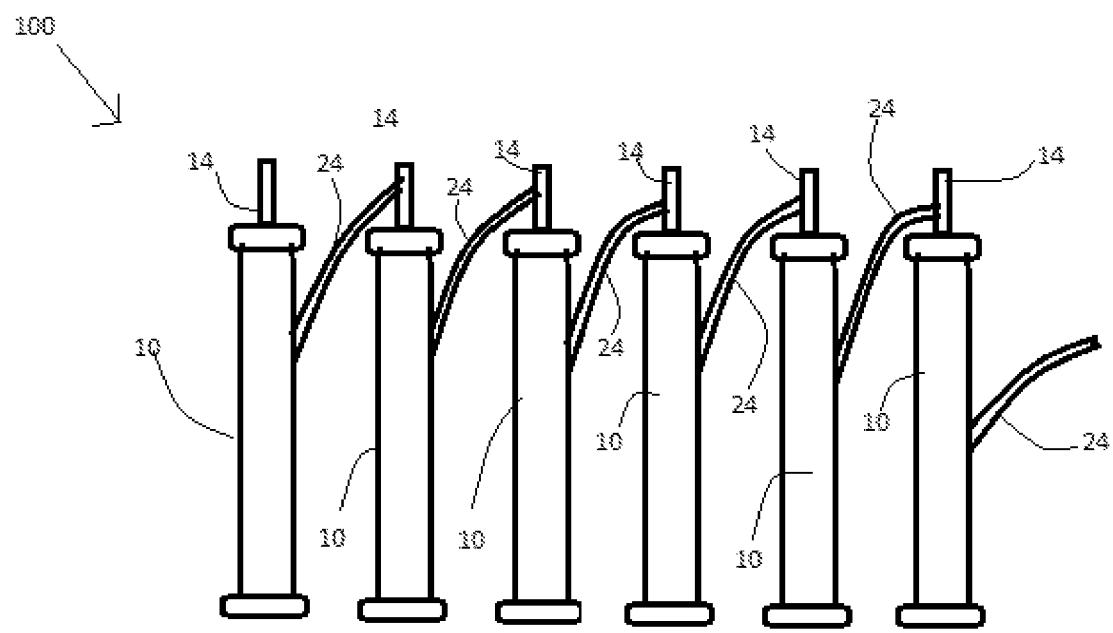
FIG. 3 is a plurality of passive electric generator system when it is placed to produce energy in series.

As seen in FIGS. 1-3, the present invention is a passive electric generator system.

The passive electric generator system 100 comprises a copper housing 10 having a first open end 10a and a second open end 10b. A first rubber plug 12 fixedly attaches to the first open end 10a of the copper housing 10. At least one metal wire 14, the at least one metal wire 14 has a length that is at least two inches greater than the copper housing 10. At least one plastic wire cover 16 that covers the at least one metal wire 14, a plurality of apertures 18 are defined in the at least one plastic wire cover. An ionic liquid 20 is housed in the copper housing 10. A second rubber plug 22 attaches to the second open end 10b of the copper housing 10 so that the at least one metal wire 14 and the at least one plastic wire cover 16 are in the copper housing 10 and the at least one metal wire 14 pierces through the second rubber plug 22 so that an end 14a of the at least one metal wire 14 rests outwardly from a top side 22a of the second rubber plug 22 for a length that is at least two inches, wherein the end 14*a* of the at least one metal wire 14 is of a negative polarity. And, at least one electrical conductive wire 24 fixedly attaches to an outer surface 10*c* of the copper housing 10, wherein there will be the same number of the at least one metal wire 14 and the at least one electrical conductive wire 24, wherein the at least one electrical conductive wire that attaches to the copper housing 10 is of a positive polarity.

In an embodiment of the present invention, the electric generator 100 comprises of an operational amplifier 30 that attaches to the at least one metal wire 14 and to the at least one electrical conductive wire 24, the operational amplifier 30 is configured to connect to a power supply.

In another embodiment, the copper housing 14 is at least six inches in depth and at least half an inch in width.

In preferred embodiments of the invention, the at least one metal wire is made of either silver or lead.

In yet another embodiment of the present invention there is a plurality of the passive electrical generator system 100 that only uses one of the at least one metal wire 14 and that uses one of the at least one electrical conductive wire 24, the plurality of the passive electric generator system 100 are connected in series.

In yet still another embodiment of the present invention, the invention comprises of a plurality of the passive electric generator system 100 that are connected in parallel and that are configured to connect to a power supply.

In a further embodiment of the present invention, the ionic liquid 20 is a diluted magnesium sulfate salt that is dissolved in a water. In a preferred embodiment the ionic liquid 20 will be made by mixing 3 or 4 teaspoons on Epson salt in water. This embodiment provides a safe mixture that will not damage the at least one metal wire 14.

In a preferred embodiment the operational amplifier will be a current OPA or a transconductance OTA when the passive electric generator system is used in parallel.

A first experiment conducted using the present invention used a plurality of half an inch copper pipes, each copper pipe only had one single positive terminal and one single negative terminal, the plurality of copper pipes were connected in series. No electronics were attached in the experiment. The experiment showed that 30 half inch pipes connected in series produces a constant flow of 12 V DC, so extrapolating this, a 12 inch by 12 inch panel will fit up to 190 half inch pipes, it is estimated that the panel will charge up to six 12 V batteries that can be used to operate a power supply or multiple power supplies (without having to uses a public utility) to operate any equipment needed in a location. If it foreseen that four half inch copper pipes/housing of the present invention, can energize any high gain QUAT like the MAXIM 34406 with a high gain that will be up to 200 V DC per unit, or only one to activate a TEXAS INSTRUMENTS OPA 455 with high gain that is up to 150 V DC.

In a parallel circuit experiment that used an embodiment of the present invention, the experiment used three-fourths of an inch pipes, and each pipe had 12 positive terminals and twelve negative terminals. Using a low gain NTE 834, in a twelve inch by twelve inch panel, I placed 144 of the three-quarter inch pipes, each pipe had twelve positive terminals and twelve negative terminals, and each pipe accommodated three NTE 834*s*, so 144 pipes times 3 NTE 834*s* per pipe equals 432 NTE 834*s*. The power supply set at only thirty-two V DC, produced 4 outputs at 32 V and 300 0.300 mA, so in a parallel circuit, the V was a constant 32 V and AMPS multiplied by 3 times per three quarter inch pipe=0.900 mA per pipe times 144 pipes per twelve inch by twelve inch panel=129.60 AMPS times 32 V to get a wattage of 4, 147.20 Watts. The inventor's first choice would have been to use a high gain max 34406, but the size of it and the fact that it had no welding base made it impossible for him to conduct the experiment using the 34406. His second choice was an OPA 455, yet he was not able to receive the part prior to the preparation of this application to conduct the experiment using the OPA 455.

An advantage of the present invention is that it provides a passive electric generator system that is cost effective to produce.

Another advantage of the present invention is that it provides a passive electric generator system that can be recycled.

Yet another advantage of the present invention is that it provides a passive electric generator system that produces electric energy while causing minimal damage to the environment.

Yet still another advantage of the present invention is that it provides a passive electric generator that provides a cheap source of energy to the consuming public.

And, yet still another advantage of the present invention that provides a passive electric generator that does not release pollutants to the environment while creating energy.

While the inventor's above description contains many specificities, these should not, be construed as limitations on the scope of the passive electric generator system, but rather as an exemplification of several preferred embodiments thereof. Many other variations are possible. Accordingly, the scope should be determined not by the embodiments illustrated, but by the specification, the drawings, and the appended claims and then legal equivalents.

What is claimed is:

1. A passive electric generator system that does not require solar energy or fossil fuels, the electric generator comprises:
    a copper housing having a first open end and a second open end;
    a first rubber plug fixedly attached to the first open end of the copper housing;
    at least one metal wire, the at least one metal wire having a length that is at least two inches greater than a length of the copper housing;
    at least one plastic wire cover that cover the at least one metal wire, having a plurality of apertures defined in the at least one plastic wire cover;
    an ionic liquid is housed in the copper housing;
    a second rubber plug that attaches to the second open end of the copper housing so that the at least one metal wire and the at least one plastic wire cover are in the copper housing and the at least one metal wire pierces through the second rubber plug so that an end of the at least one metal wire rests outwardly from a top side of the second rubber plug for a length that is at least two inches, wherein the end of the at least one metal wire is of a negative polarity; and
    at least one electrical conductive wire fixedly attaches to an outer surface of the copper housing, wherein there will be the same number of the at least one metal wire and the at least one electrical conductive wire, wherein the at least one electrical conductive wire that attaches to the copper housing is of a positive polarity.

2. The passive electric generator system that does not require solar energy or fossil fuels of claim 1, wherein the electric generator comprises of an operational amplifier that attaches to the at least one metal wire and to the at least one electrical conductive wire, the operational amplifier is configured to connect to a power supply.

3. The passive electric generator system that does not require solar energy or fossil fuels of claim 2, wherein the copper housing is at least six inches in depth and at least half an inch in width.

4. The passive electric generator system that does not require solar energy or fossil fuels of claim 3, wherein the at least one metal wire is made of silver.

5. The passive electric generator system that does not require with solar energy or fossil fuels of claim 3, wherein the at least one metal wire is made of lead.

6. The passive electric generator system that does not require solar energy or fossil fuels of claim 1, wherein the ionic liquid is a diluted magnesium sulfate that is dissolved in a water.

7. A passive electric generator system that does not require solar energy or fossil fuels, the electric generator system comprises:
- a plurality of electric generators that are connected in series, each of the electric generators of the plurality of electric generators comprises:
  - a copper housing having a first open end and a second open end;
  - a first rubber plug fixedly attached to the first open end of the copper housing;
  - at least one metal wire, the at least one metal wire having a length that is at least two inches greater than a length of the copper housing;
  - at least one plastic wire cover that cover the at least one metal wire, having a plurality of apertures defined in the at least one plastic wire cover;
  - an ionic liquid is housed in the copper housing;
  - a second rubber plug that attaches to the second open end of the copper housing so that the at least one metal wire and the at least one plastic wire cover are in the copper housing and the at least one metal wire pierces through the second rubber plug so that an end of the at least one metal wire rests outwardly from a top side of the second rubber plug for a length that is at least two inches, wherein the end of the at least one metal wire is of a negative polarity; and
  - at least one electrical conductive wire fixedly attaches to an outer surface of the copper housing, wherein there will be the same number of the at least one metal wire and the at least one electrical conductive wire, wherein the at least one electrical conductive wire that attaches to the copper housing is of a positive polarity.

8. A passive electric generator system that does not require solar energy or fossil fuels, the electric generator system comprises:
- a plurality of electric generators that are connected in parallel and that are configured to connect to a power supply, each of the electric generators of the plurality of electric generators comprises:
  - a copper housing having a first open end and a second open end;
  - a first rubber plug fixedly attached to the first open end of the copper housing;
  - at least one metal wire, the at least one metal wire having a length that is at least two inches greater than a length of the copper housing;
  - at least one plastic wire cover that cover the at least one metal wire, having a plurality of apertures defined in the at least one plastic wire cover;
  - an ionic liquid is housed in the copper housing;
  - a second rubber plug that attaches to the second open end of the copper housing so that the at least one metal wire and the at least one plastic wire cover are in the copper housing and the at least one metal wire pierces through the second rubber plug so that an end of the at least one metal wire rests outwardly from a top side of the second rubber plug for a length that is at least two inches, wherein the end of the at least one metal wire is of a negative polarity; and
  - at least one electrical conductive wire fixedly attaches to an outer surface of the copper housing, wherein there will be the same number of the at least one metal wire and the at least one electrical conductive wire, wherein the at least one electrical conductive wire that attaches to the copper housing is of a positive polarity.

\* \* \* \* \*